(12) United States Patent
Lau et al.

(10) Patent No.: US 7,092,707 B2
(45) Date of Patent: Aug. 15, 2006

(54) SERVICE IMPACT ANALYSIS AND ALERT HANDLING IN TELECOMMUNICATIONS SYSTEMS

(75) Inventors: Richard Lau, Morganville, NJ (US); Krishna Kant, Shrewsbury, NJ (US); Ram Khare, Red Bank, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 164 days.

(21) Appl. No.: 10/779,432

(22) Filed: Feb. 13, 2004

(65) Prior Publication Data

US 2005/0181835 A1    Aug. 18, 2005

(51) Int. Cl.
  H04Q 7/20    (2006.01)
  H04B 1/38    (2006.01)
  H04B 7/00    (2006.01)
(52) U.S. Cl. ............... 455/423; 455/567; 455/512; 379/29.01
(58) Field of Classification Search ............ 455/423, 455/424, 425, 426.1, 432.1; 379/29.01
  See application file for complete search history.

(56) References Cited

U.S. PATENT DOCUMENTS

| | | | | |
|---|---|---|---|---|
| 5,285,494 | A * | 2/1994 | Sprecher et al. | 455/423 |
| 5,408,218 | A * | 4/1995 | Svedberg et al. | 340/507 |
| 6,012,152 | A * | 1/2000 | Douik et al. | 714/26 |
| 6,233,449 | B1 * | 5/2001 | Glitho et al. | 455/423 |
| 6,442,547 | B1 * | 8/2002 | Bowman-Amuah | 707/10 |
| 6,477,373 | B1 * | 11/2002 | Rappaport et al. | 455/436 |
| 6,556,659 | B1 * | 4/2003 | Bowman-Amuah | 379/9.04 |
| 6,807,416 | B1 * | 10/2004 | Nyholm | 455/423 |
| 6,901,530 | B1 * | 5/2005 | Cerami et al. | 714/4 |

* cited by examiner

Primary Examiner—Tilahun Gesesse
(74) Attorney, Agent, or Firm—William A. Schoneman; Joseph Giordano

(57) ABSTRACT

A system for the prioritization of quality of service (QoS) alerts and the analysis of the impact of such alerts on service uses a service model in which services are broken into one or more service components and sub-components. Creation of a service dependency model, which is driven by different phases of a service, is key to being able to understand how alerts at the lowest level of the network components affect the overall service for which they are but a component. Alerts are assigned a "handle" and a severity level. Rules are defined to be applied to the alerts to create a Component Status Indicator for each component including a handle. As each CSI propagates up towards the top of the service model dependency graph, each CSI gets modified according to predefined rules. A service impact index is created when the CSI is propagated to the top service component. For each service that is impacted, weights (multiplier) are defined according to duration of the alert, number of subscribers, number of services, QoS class of the services impacted or other factors defined by user. The weights are used to multiply the SII to obtain the overall impacting index, which is sorted to obtain the priority list. This method can be employed either centrally at a network operations center or in a distributed manner by pre-processing at central offices. Information contained in the handle component of the CSI can be used to perform root cause analysis of the service impacting alerts so as to more efficiently identify and correct problems.

20 Claims, 11 Drawing Sheets

SERVICE IMPACT ANALYSIS AND ALERT HANDLING IN TELECOMMUNICATIONS SYSTEMS

FIELD OF THE INVENTION

This invention is related to the handling and analysis of quality of service alerts, including alarms, in a telecommunications system. More specifically, the invention is related to a method for the prioritization of quality of service (QoS) alerts and the impact analysis of such alerts in a wireless telecommunications system. The method also provides for root cause analysis of the alerts, particularly of alarms of the highest priority.

BACKGROUND

In telecommunications systems such as cellular systems based on TDMA, CDMA or GSM or 2.5G networks based on GPRS, service providers are challenged by competition to provide ever-improving service quality. As many different telecommunications services emerge, particularly many new wireless services, the service assurance problem becomes increasingly challenging. In the current Network Operation Center (NOC), it is not uncommon to receive hundreds to thousands of various alerts, warnings and alarms in various forms. The NOC personnel dealing with trouble shooting and problem resolutions are usually highly trained technicians specializing in certain specific technology areas. Traditionally, the NOC group is separate from the information technology (IT) organization managing applications and internal IP networks. Problems occurring in one domain are not normally handled with consideration of impacts from other domains. In particular, there is no methodology or procedure in place for the prioritization or root cause analysis of QoS problem.

Current service management is comprised of isolated network management systems and an information technology (IT) based management environment. Network management tasks consist of collecting large amounts of performance data, generating weekly or monthly reports and logging large amounts of events and alarms. Data are mostly generated by a number of disjoint Element Management System (EMSs) or, in some cases, by individual Network Elements (NE). In the service and application areas, traditional IT management platforms such as Openview from Hewlett-Packard, Unicenter from Computer Associates or Tivoli from IBM is popular for monitoring and logging of server and LAN-related alarms and events. There are, however, no correlation between these IT based management platforms and other EMSs. For each isolated domain, true service management is performed by the personnel taking care of a particular domain (application, core, access). Different domains normally are handled by different organizations, which are operated independently with little interaction among each other. There is no integrated and correlated view of service quality and there are inconsistent efforts toward service assurance or long-term planning.

The increasing dependence on wireless technology whether 2G, 2.5, or 3G cellular technologies or wireless LAN (WLAN) technology such as 802.11 WiFi based systems, adds additional complexity to service issues. Bottom-up service assurance systems are focused on collecting data from various network elements or sub-systems but are not focused on whether various services desired by the customer are actually being provided to the satisfaction of the customer.

The overall goal of impact analysis is to quantify service quality degradation with respect to certain predefined service level criteria. The result of such impact analysis can then be used to support the prioritization of service and network alarms, service QoS alerts, and network performance threshold crossing alerts or other performance impacting events with respect to trouble ticket generation. Additionally, the results may be used to support prioritization of network and service resource expansion or for the adjustment of service level agreements for marketing and contractual purposes.

As wireless services proliferate and as each has a shorter life cycle, it is becoming increasingly difficult to train NOC operators with the right skills to handle the various types of services related QoS problems. To assist the NOC personnel on prioritization of QoS alarms, it is desirable that there are tools to collect and extract relevant information regarding the alerts and prioritize them with respect to the impact on customers, quality of services and other criteria such as marketing and planning.

For each component of a service, there is a set of Key Performance Indicators (KPIs) associated with it. Assuming that a service model has 40 components and each has 30 KPIs, that is a total of 1200 KPI for a service. If there are 20 services active at once, we can be potentially dealing with over a 20,000 KPIs. Suppose at a given time, there are 1% of the KPIs cross threshold and generate alerts that amounts to over 200 QoS alerts at a given time. Besides the volume of KPIs and their alerts, it is also difficult to write algorithms that are specific to a particular KPI. Therefore, the impact analysis algorithm has to deal with the scalability and complexity issues at the same time.

Further, it would be desirable to have a method and system to permit systematic prioritization of QoS alarms with respect to some quantitative impact index.

Additionally, it would be desirable to have a system and method that uses a dependency model of a service to prioritize and analyze alert impact.

It would also be desirable to have a method and system that is able to provide impact analysis for a large-scale network and does not suffer from scalability issues.

Finally, it would be desirable to have a method and system capable of assisting the network operator in a root cause analysis of the service impacting alerts identified by the alert prioritization and service impact analysis system.

SUMMARY

The present invention provides a method and system for prioritizing alarms in a telecommunications network, particularly wireless networks. QoS alerts or alarms are received an algorithm is used to generate a priority index. Alerts refer to both hard failure alarms caused by failure of specific physical components and alerts issued as the result of one or more performance or other indicators crossing a pre-determined threshold. Prioritization identifies the following: the service or services that are affected by the QoS alert; the extent to which each service is affected; and, the impact on the customer of the service.

The present inventive method and system addresses these questions by identifying the affected services, determining the service quality impact based on a Key Quality Indicator, Service Impact Index (SII) and Severity of Degradation (total interruption, duration of the interruption, performance degradation and data transfer accuracy). The system also determines the number of subscribers affected (the percentage of premium and regular customers). Using the information, the system and method applies a set of rules to weight them to create a final priority index.

A service model is first constructed in a graph structure, which captures the dependency of service level and network level components. This service dependency model provides a basic framework for the correlation of QoS Key Performance Indicators (KPIs). A set of rules is applied to the alerted KPIs of each of the components to create the Component Status Indicator (CSI). The CSI contains one or more handles which specify information about the cause of the alerts. As the CSI propagates towards the service component, additional CSI information is used to modify the current CSI. The CSI will ultimately be mapped into a set of weights that captures the impact with respect to service impact index (SII). The SII is then weighted with other parameter including the number of services impacted, the number of subscribers, QoS class, and the duration of the alert. Final prioritization is achieved by sorting the overall impact index with respect to each CSI. Information contained in the handle of the CSI can be used by network operators to perform root cause analysis and thereby aid in the diagnosis and correction of the problem causing the alert.

DETAILED DESCRIPTION

In order to describe the prioritization system and method a service model for describing the service will first be described. A service is the product sold by network operators to their customers. An end-to-end service is a complete round trip interaction or session as experienced by and end-user customer.

A service can be viewed as a combination of sub-services or domains. A service may include different bearer services and information services, as well as customer or service specific links. For store (or deliver) and forward services such as email, short messaging service (SMS) or multimedia messaging service (MMS), instead of one round tip end-to-end interaction there are two separate interactions—deliver and forward. Various sub-services may interact to provide an end-to-end service. The layered approach includes the underlying network, bearer services, one or more information services and inter and intra service bearers.

A service model is used to provide operators with a common repository and reference for service inventory, services and sub-services and their components. A service model provides a means for defining and customizing service level agreements (SLA), Key Performance Indicators (KPIs), Key Quality Indicators (KQIs) and overall Service Indices (SI).

Key Performance Indicators (KPIs) are the lower level parameters from network components such as the number of time slots available in a wireless GSM based cellular system.

Key Quality Indicators (KQIs) are parameters indicative of service quality, for example, the percentage of base stations in a GSM system that are unavailable over a period of time. A KQI is based on one or more KPIs.

Service Index (SI) summarizes the overall service quality in such a way that indicates the overall performance of a service. SI, KQI, and KPI form a hierarchy of quality indicators. SI is computed by a weighted sum of the KQIs.

The basic building block of the service model is a service component. A service component is a logical entity that impacts service quality. Service modeling may be done by decomposition based on phases of the service (e.g., the authentication phase or data transfer phase) or the topology of the service. A service can be decomposed into several categories such as customer-facing or service and network layers. Components are associated with one another in a dependency graph, which is an acyclic multi-connected directed graph. Each directed edge in a dependency graph between components A and B represents a dependent association between A and B. Performance of A depends on the performance of B, i.e., the performance of B impacts the performance of A.

Figure 1:
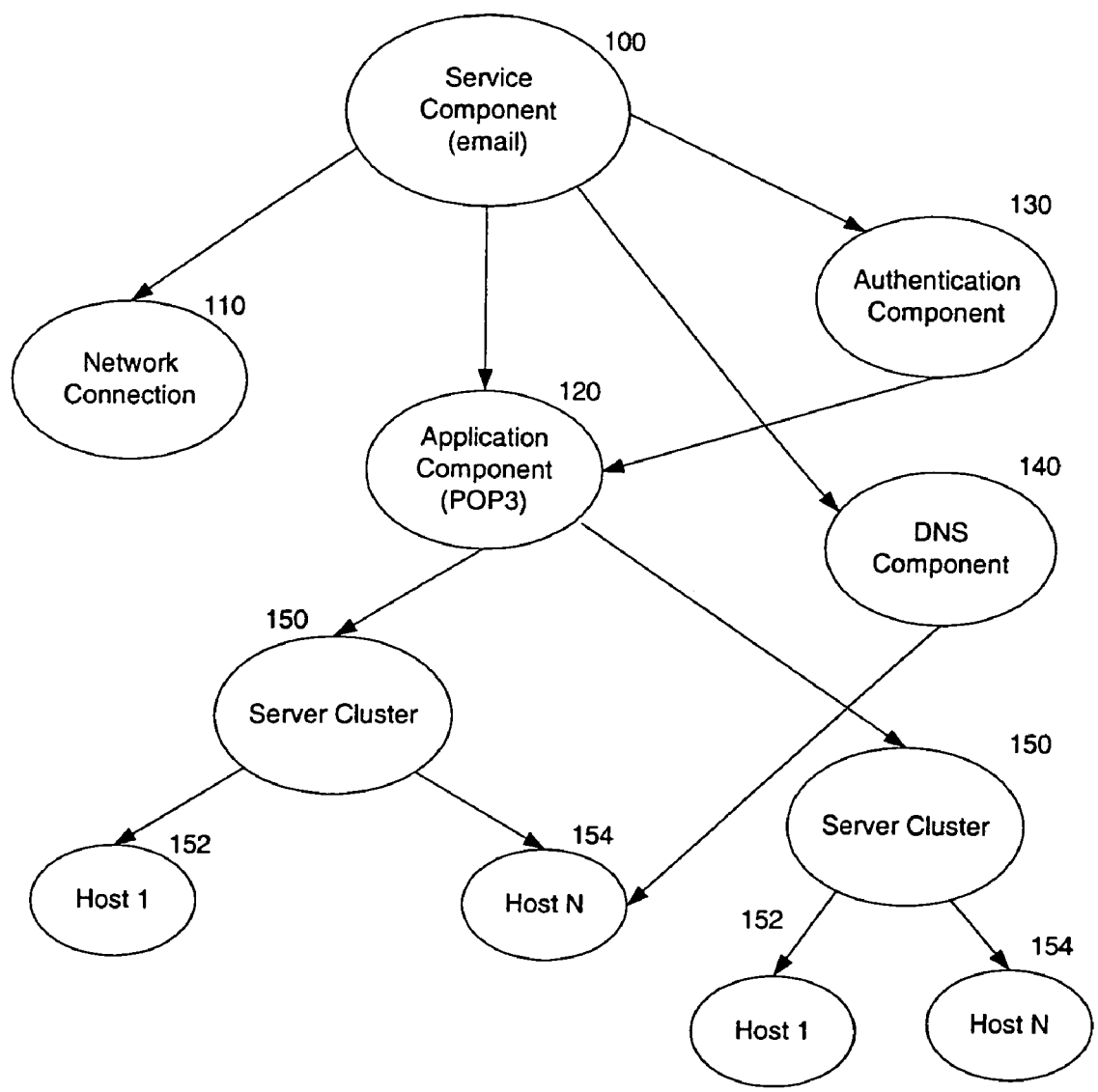
FIG. 1 depicts an example of a service model dependency graph.

A customer-facing component is a service component whose Quality of Service requirement is part of a service level agreement (SLA), both internal and external, with the customer. Each customer-facing component can be monitored and assured, and each potentially has SLAs associated with it. An example of a service is VOIP, where the customer facing components are "call set up" and "data transfer." In this case, call set up may use the same or different service components as those for data transfer. A customer-facing service component combines service components with transport/bearer networks to customers, e.g., email/WAP/GPRS service combines WAP and email service components, DNS, DHCP and other setup service components, GPRS bearer network to the customer, inter-service bearer networks, and the WAP and email client applications on the customer handset or mobile station. This combination is accomplished by creating dependency associations between the customer-facing component and the supporting service and network components. In other words, email/WAP/GPRS service depends on the email service component, the GPRS bearer component, the DHCP service component, etc. FIG. 1 depicts an example of a service model dependency graph. A service component 100 such as email is directly dependent on four sub-components of the service: network connection 110, application component 120, authentication component 130 and DNS component 140. The network connection 110 is the connection between the service user and the e-mail server such as a DSL or cable modem connection. The application component 120 is a Post Office Protocol 3 (POP3) application for retrieving e-mail from a server. The application component 120 depends on one ore more server clusters 150 and their respective hosts 152 and 154. Authentication component 130 is the component responsible for user authentication. DNS component 140 is the component responsible for mapping the host name to the host's IP address.

One or more KQIs/KPIs are associated with each of the components in a dependency graph. For example in FIG. 1, the authentication component 130 has KQIs/KPIs based on failed requests and average response time. Application component 120 has a KQI/KPIs based on session messages, i.e., client session numbers and the number of successful transactions. DNS component 140 has KPIs based on availability and response time. Server clusters 150 have KPIs based on load balance and the number of working hosts. Hosts 152 and 154 have KPIs based on CPU usage and memory usage.

In order to ensure that all sub-service components and network bearer components are included in the dependency graph of a customer facing service, a complete communication flow for the service must be developed. All components and processes for this flow may be accounted for in the dependency graph.

Service components are logical components directly supporting the customer-facing components. For example, email service over WAP will require GPRS service, WAP access service and email—both POP3 and SMTP service components. Service components represent the collocation of components specific to a particular service type and combine various application components, as well as, networks required to support any required communication between those applications. For example, email service depends on POP3 server application component, POP3 proxy application component, SMTP application component and IP LAN to connect these application clusters. Application components represent all the resources deployed to support one particular application and depend on one or more server clusters and any required network bearer supporting components for communication between the clusters. For example, the POP3 server application component can include two separate load-balanced POP3 server clusters.

Figure 2:
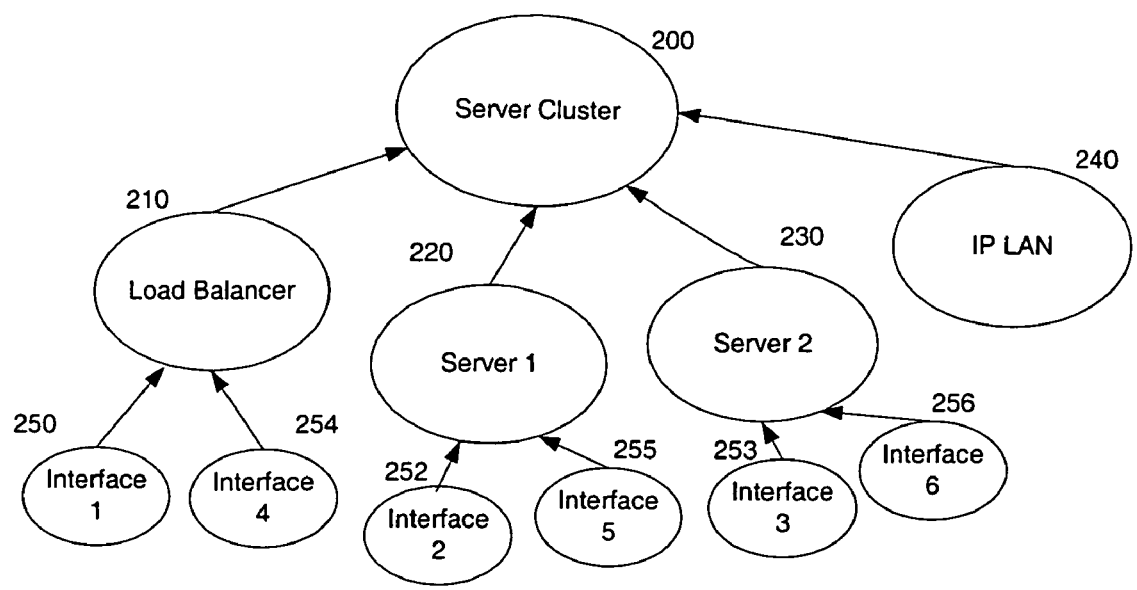
FIG. 2 depicts an example of load balanced server cluster service model.

A server cluster component represents a single server from the client perspectives that can back-end to either a single server or a load balanced cluster. The server cluster depends on a number of software and host components, as well as any required network bearer components required for inter-cluster communication. FIG. 2 depicts an example of load balanced server cluster service model. In contrast to FIG. 1, in FIG. 2 (as well as in later FIGS.) the arrows point up from the lower most elements to show the impact of lower elements on the upper elements. Server cluster 200 is dependent on four components: a load balancer 210, a plurality of servers 220 and 230 and an IP LAN 240 to communicate with the servers. In FIG. 2 the interfaces 1–6 are IP LAN interfaces on the load balancer and server hosts. Load balancer has two interfaces, 1 and 4, and servers have interfaces 2, 5 and 3, 6. Out of these it is assumed that only interfaces 2 and 3 are connected to interface 1 and 4 respectively. Thus, although the performance of server 1 is impacted by the performance of interfaces 2 and 5 and the performance of server 2 is impacted by the performance of interfaces 3 and 6, the performance of interfaces 2 and 3 only impact the performance of the server cluster.

A description is given of each component type, and the rules for QoS alert triggering and propagation are provided. The Server Cluster service component represents a single point-of-entry from the client perspective, where client requests may be handled by either a single server or by multiple servers in a load-balanced server cluster. An example of a server cluster is an SMTP server cluster, which uses the DNS round-robin mechanism to balance incoming SMTP messages among a number of SMTP hosts. The cluster can consist of a single host with no load balancing software, or multiple hosts with load balancing software. The term "load balancing" is used in a high-level context, to refer to a system that uses software to balance the load between multiple servers: for example, it does not refer to a multiprocessor computer host where the host operating system balances CPU load between the multiple processors.

A Server Cluster can have performance alerts, load-related performance alerts, availability alerts, and misbalancing alerts. Performance and Load alerts are triggered by poor performance or high load in the software subcomponents. A mis-balance alert is triggered when one or more of the child server software components are experiencing much different load levels than the other child components.

The Server Cluster component represents the entire cluster; it is not to be confused with the load-balancing mechanism of a multi-host cluster. In the example above, the DNS load balancing mechanism of the cluster would be modeled as a separate Load Balancing component of the service model, which impacts the parent Server Cluster component.

Figure 3:
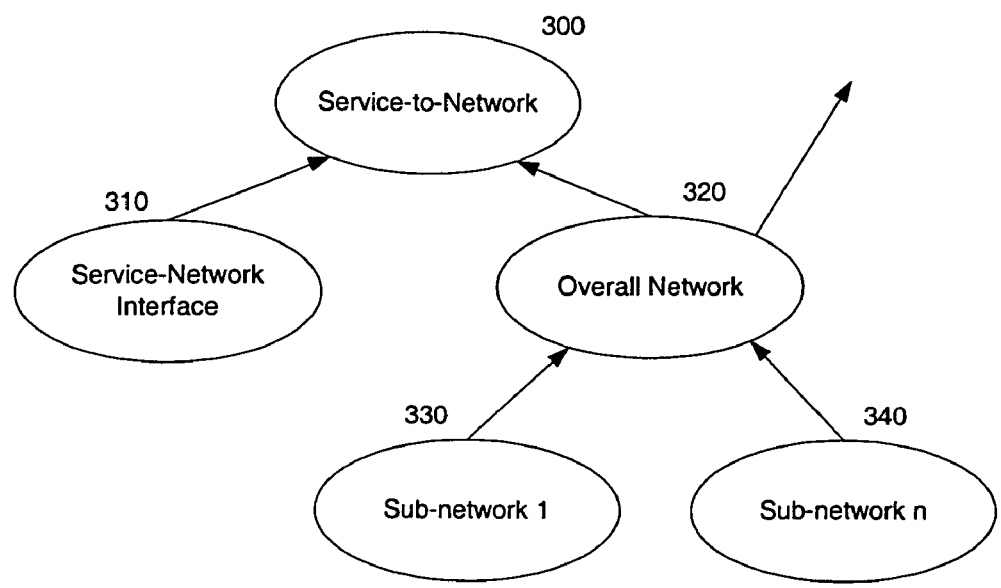
FIG. 3 depicts an example of a network component service model.

Network bearer components are transport-related components that support a wide variety of other components. This component depends on overall network group components (which are shared among a number of network bearer components) as well as specific network interface and network node components, which are deemed to particularly impact the bearer component. For example, the bearer component representing a server cluster which uses a shared IP LAN for communication between the hosts will depend on a network bearer component which in turn will depend on a (1) the IP LAN network group component and (2) the individual server host interfaces. The IP LAN will in turn depend on a collection of routers, switches, interfaces and other network elements; and this LAN component will impact other network bearer components that share the same LAN. FIG. 3 depicts an example of a network component service model. Service-to-Network 300 is dependent on the service-network interface 310 and the overall network 320. The overall network 320 is dependent on a plurality of sub-networks 330 and 340.

Multimedia messaging service (MMS) is presented as an example of the modeling method of the present invention. MMS is an end-to-end, store and forward, service for person to person mobile messaging. It provides rich multimedia content including images, audio, video, data and text, yet is designed to be easy to use. MMS is related to the short messaging service (SMS). With MMS, however, the final delivery of the message is not pushed to the user as in SMS. Rather, the user is notified of the message and is given the option to download the message. As a result, the delivery of the message may not be immediate. The service is in two steps. First, mm is sent from the sender (MM Mobile) to the MMSC for temporary store, and then it is sent from MMSC to its destination, which is a MM mobile, legacy mobile or an email client.

MMS is broken into three sub-services: MM-MM, MM-LM and MM-email. For each sub-service two phases are defined: setup and data transfer. These phases are defined because they are directly related to the customer perception of the service. Customers perception is measured in the form of service impact index (SII) (also called service index), which is derived from impact, resulted from lower level service or network component alerts.

Wireless services can comprise a plurality of sub-services: Mobile-to-Mobile (MM-MM); Mobile-to-Legacy Mobile (MM-LM); Email-based; Content Initiated; and Pre-paid. A Mobile-to-Mobile sub-service is presented as an illustrative example of the present invention.

The Mobile-to-Mobile sub-service can be decomposed into two phased components: 1) the setup phase component; and, 2) the data transfer phase component. The reason for this decomposition is that these two phases of the service have quite different quality requirements as perceived by the user. To understand how the phases are dependent on other components, there must be a clear definition of the service. Sub-phase 1 is the authentication of Handset 1 (HS1). Sub-phase 2 is the authentication of HS1 WAP (Wireless Access Protocol) and sub-phase 2 is the authentication of the HS1 Multimedia Messaging Service (MMS). Sub-phase 4 is the transfer of data from HS1 to the MMS. Sub-phase 5 is the notification/acknowledgement of Handset 2 (HS2). Sub-phase 6 is the request of HS2 to send. Sub-phase 7 is the authentication of HS2. Sub-phase 8 is the sending of data to HS2 and sub-phase 9 is the notification to HS1.

Figure 4:
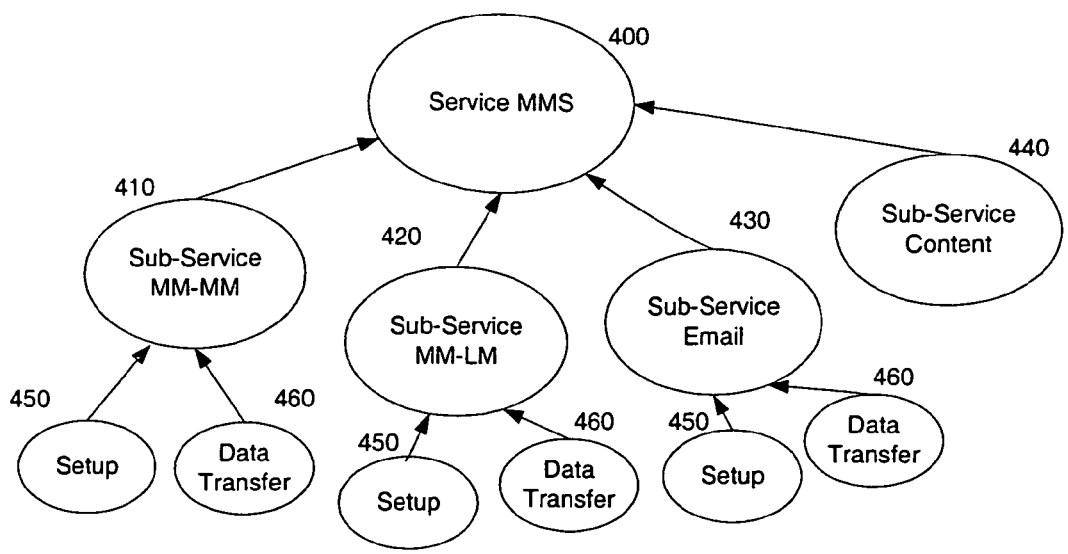
FIG. 4 depicts a high-level service model dependency graph for the MMS service.

For impact analysis, these sub-phases are grouped into set-up phase and data transfer phase components. Based on the paths taken by each of these phases and the relevant network components, a service dependency model is created. Understanding the service definition allows a systematic way to construct a service model. As mentioned above, MMS is broken into four sub-services (with pre-paid being a possible fifth). The dependency of these components is shown in FIG. 4. MMS service 400 has an MM-MM sub service 410, an MM-LM sub-service 420, an e-mail sub service 430 and sub-service content 440. Each of the first three components can be broken into two separate phases: setup phase 450 and data transfer phase 460. These phases are defined because they are directly related to customer perception of the service. Customer perception is measured in the form of service impact index, or simply called service index, which is derived from the impact resulting from lower level service or network components alerts.

Figure 5:
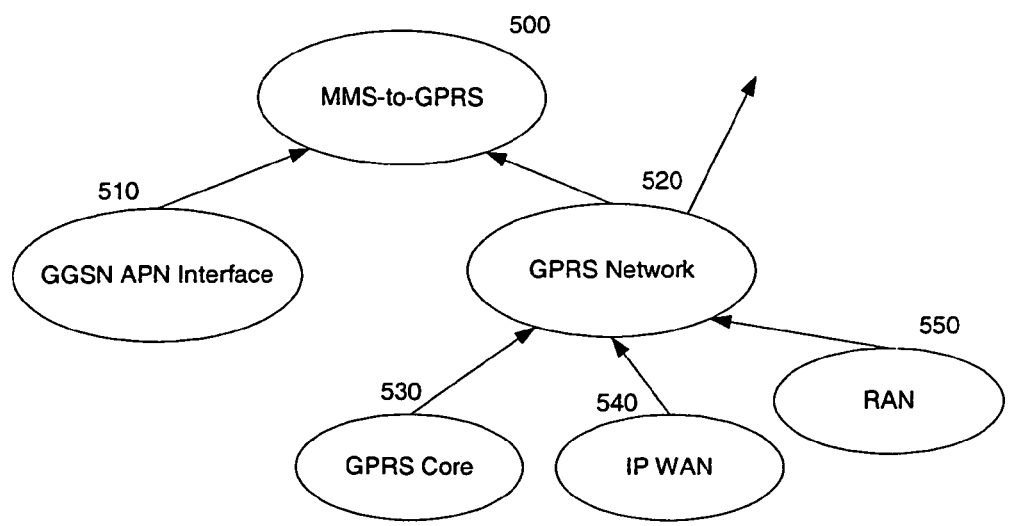
FIG. 5 depicts the service model dependency graph for the MMS-General Packet Radio Service (GPRS) component of the MMS service.

FIG. 5 depicts the MMS-General Packet Radio Service (GPRS) component 500. It has two "children" components. One is the Gateway GPRS Service Node (GGSN) Access Point Name (APN) Interface component 510. The other is the overall GPRS network component 520 which is further decomposed into three sub-components: the GPRS core 530, the Internet Protocol (IP) Wide Area Network (WAN) or IP WAN 540 and the Radio Access Network (WAN) 550. In this model, it is assumed that the three components of the GPRS network provide only general performance information about the connection between the handset and the MMS service and not virtual connection specific information. Specific performance information is assumed to come from the interface specific components.

FIGS. 6–9 show the service dependency model of MMS service including the GPRS network depicted in FIG. 5. The model uses the three categories described above: service, server/cluster, and network components. To simplify the diagram, the lowest network components are group into HI (Host and Interfaces). Moreover only single servers are shown here, but the concept is applicable to service clusters. In addition, if there are servers that are at geographical different locations, but do not form a cluster (i.e. no load sharing); those servers are considered as different service components (not shown in figure below), because they may be supported by different network components.

Figure 6:
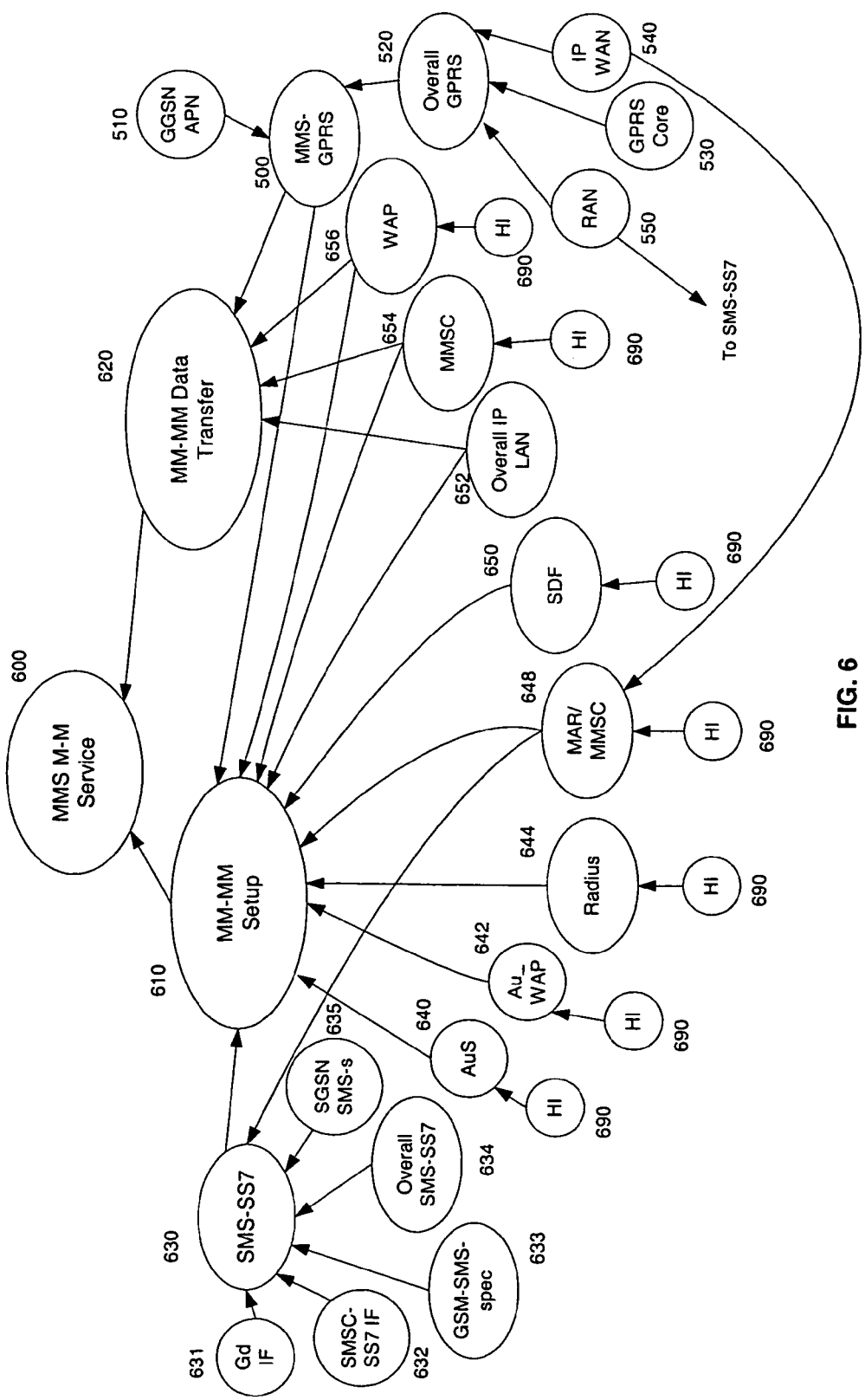
FIG. 6 depicts the dependency graph of the basic components comprising the MM-MM portion of the MMS.

The service model corresponding to the four sub-services are shown in FIGS. 6–9. FIG. 6 depicts the basic components of the MM-MM service model 600 in the dependency graph format. The set-up portion of the MM-MM service 610 depends on the SMS and Signaling System 7 (SS7) networks 630, the Authentication servers (AuS) 640, the Authentication for Wireless Access Protocol (WAP) servers 642, the Remote Authentication Dial-In User Service (RADIUS) servers 644, the Messaging Application Router/Multimedia Message Service Center (MAR/MMSC) 648 (and through that component to the IP WAN 540) and the Subscriber Data Function (SDF) servers 650. In this context, the SMS performance itself depends on the signaling interface between Serving GPRS Support Node (SGSN and Short Message Service Center (SMSC) interface 631, the SMSC-SS7 interface 632, the SMS-specific component of GSM performance (GSM-SMS-spec) 633, the overall performance of the SMS-SS7 networks 634 and the SMS specific component of SGSN performance (SGSN SMS-s) 635. The SMS-SS7 network 630 is also dependent on the RAN 550. Both the MM-MM Setup component 610 and the MM-MM Data Transfer component 620 are dependent on the overall performance of the IP Local Area Network (IP LAN) 652, the Multimedia Message Service Center (MMSC) network 654, the WAP network 656 and the GPRS network 500 as described above in FIG. 5. In FIG. 6, HI represents the Host clusters and interfaces as illustrated in FIG. 2.

Figure 7:
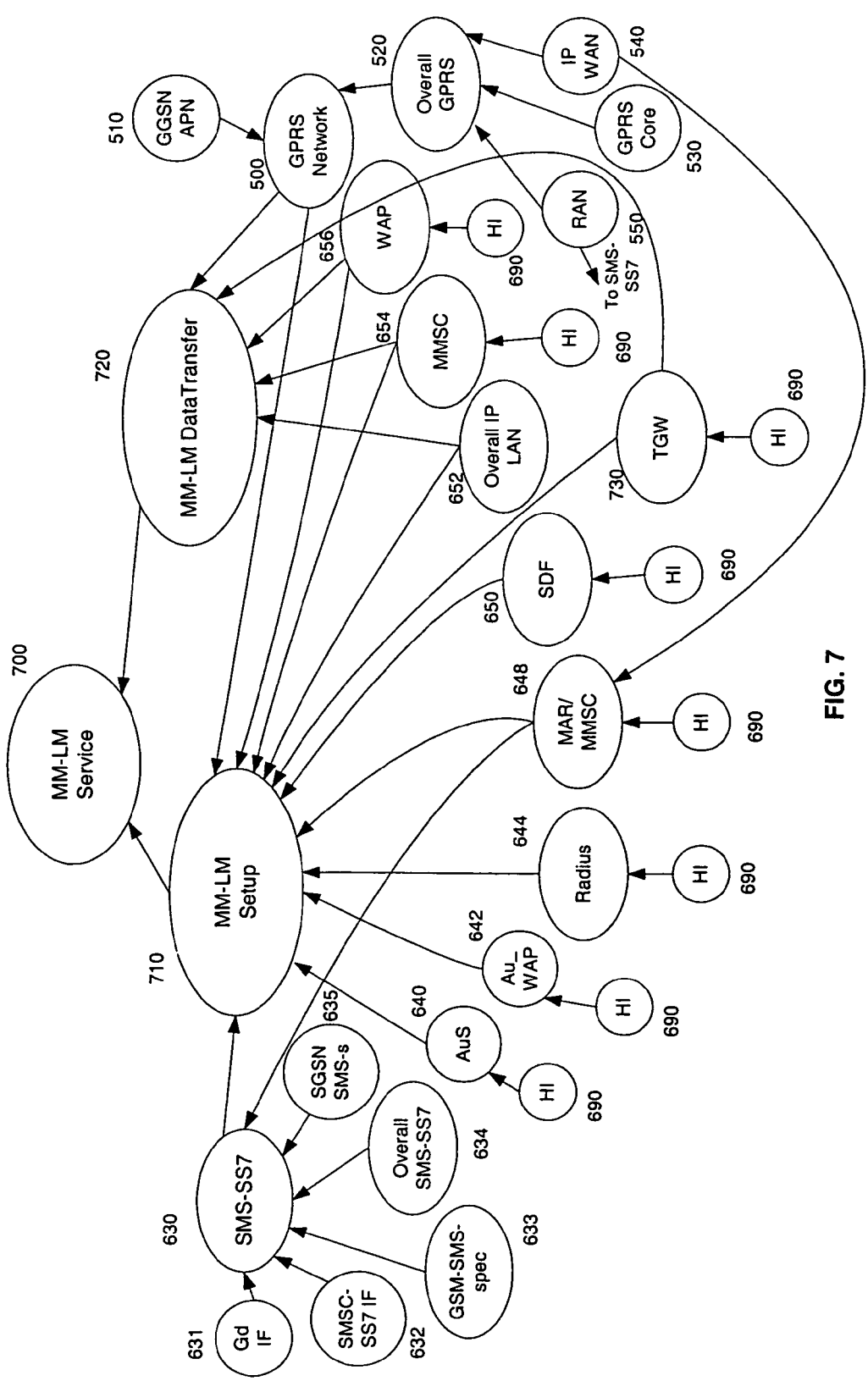
FIG. 7 depicts the dependency graph of the basic components comprising the MM-LM portion of the MMS service.

FIG. 7 depicts the basic components of the MM-LM service model 700 in the dependency graph format. All of the components for MM-LM setup phase 710 and the MM-LM data transfer phase 720 are the same as in FIG. 6 except for the additional dependency of each on the Terminal Gateway server (TGW) 730.

Figure 8:
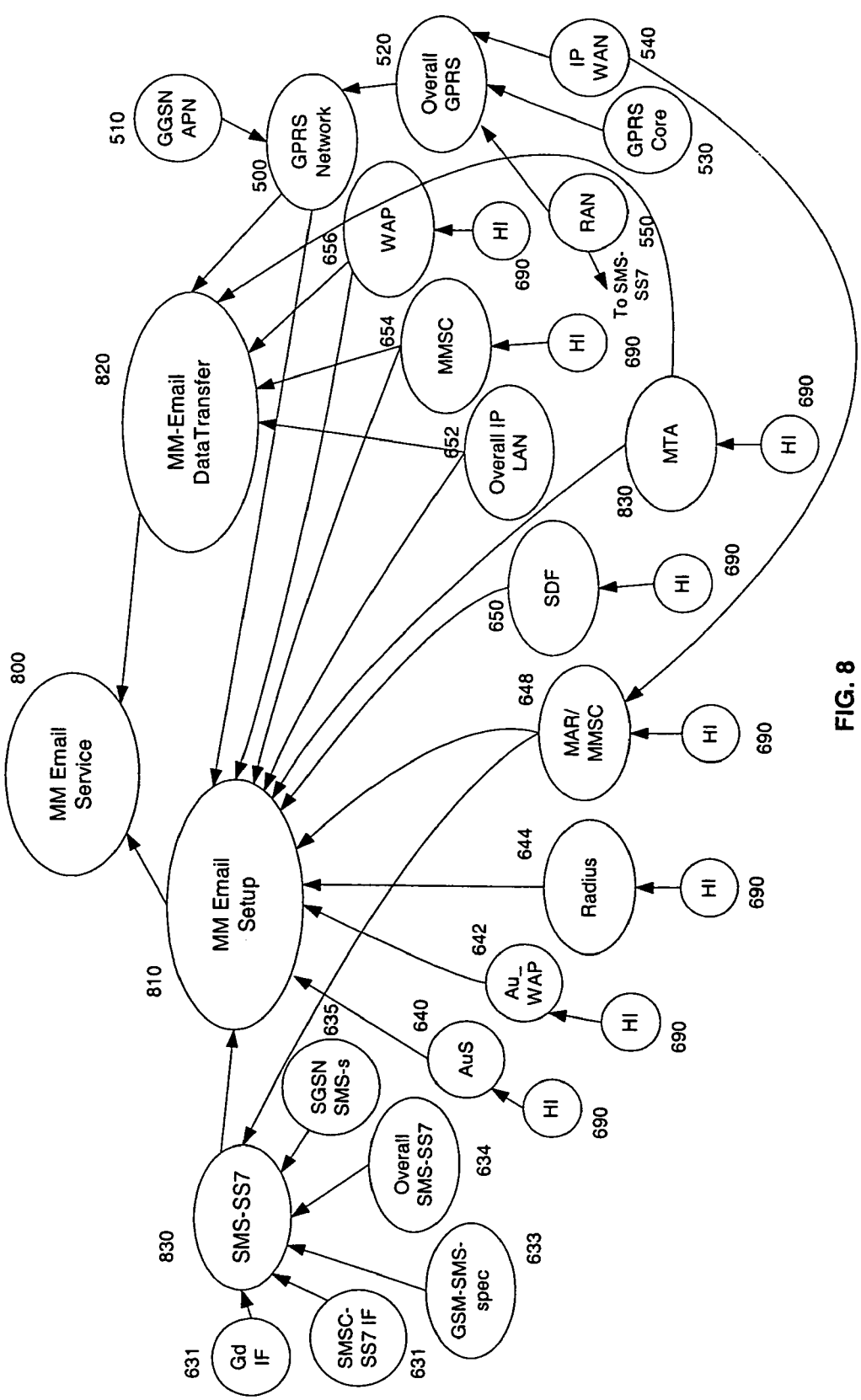
FIG. 8 depicts the dependency graph of the basic components comprising the MM Email portion of the MMS service.

FIG. 8 depicts the basic components of the MM Email service model 800 in the dependency graph format. All of the components for MM Email setup phase 810 and the MM Email data transfer phase 820 are the same as in FIG. 6 except for the additional dependency of each on the Message Transfer Agent (MTA) 830.

Figure 9:
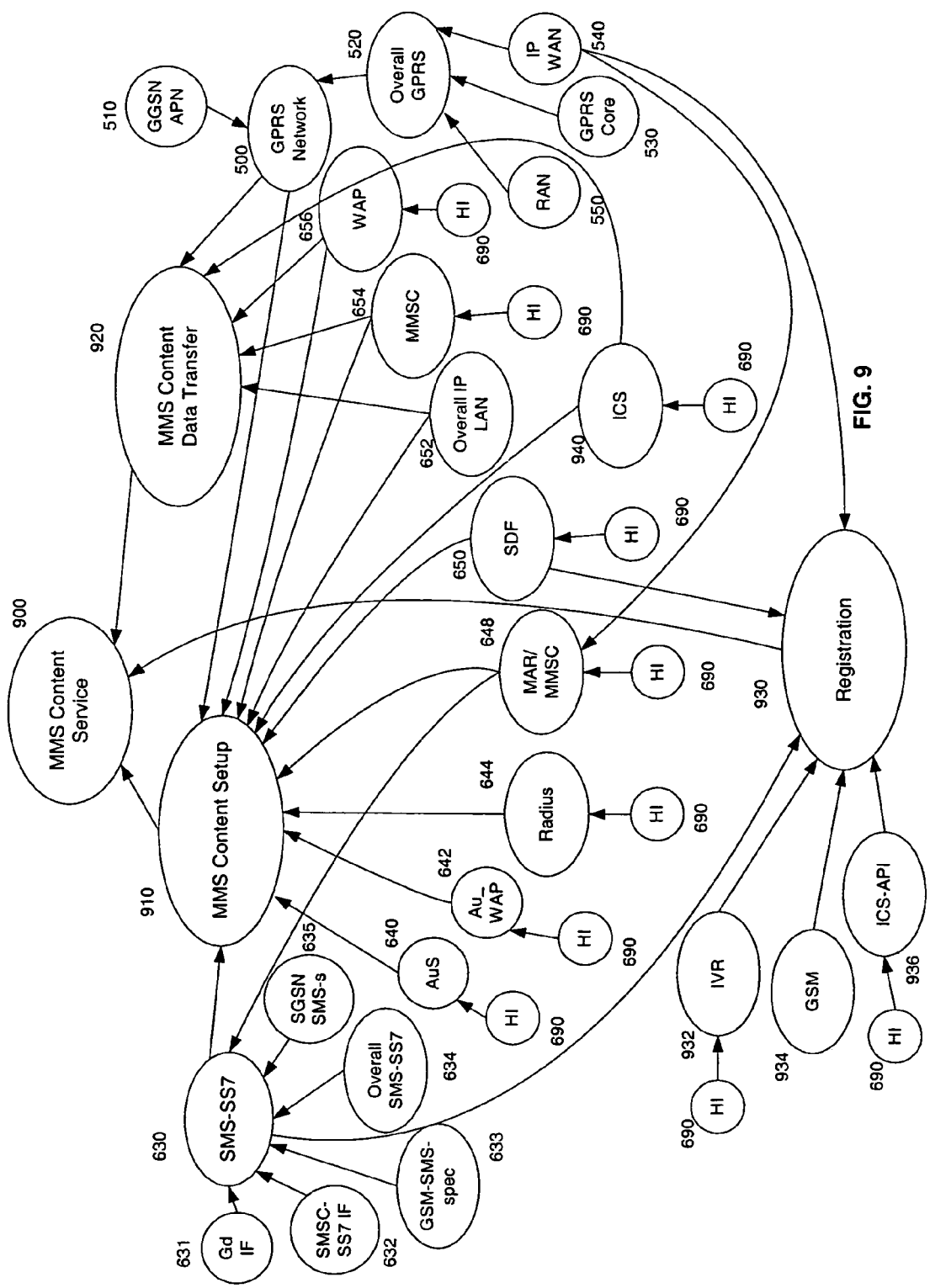
FIG. 9 depicts the dependency graph of the basic components comprising the MMS content portion of the MMS service.

FIG. 9 depicts the basic components of the MMS Content Service 900 in the dependency graph format. The MMS Content Service 900 contains a Registration phase 930 in addition to the MMS Content Service phase 910 and the MMS Content Data Transfer phase 920. All of the components for the MMS Content Setup phase 910 are the same as in FIG. 6. All of the components for the MMS Content Data Transfer 920 are the same as in FIG. 6 except for the additional dependency on the Information Content Server (ICS) server 940. The Registration phase 930 is dependent on three previously described components: SMS-SS7 640, SDF 650 and IP WAN 540 as well as the ICS server 940. Additionally, the Registration phase 930 is dependent on an Interactive Voice Response (IVR) server 932, GSM servers 934 and ICS to SDF Server API (ICS-API) 946.

The identification of affected service is dependent on how the service is implemented and the components of the service. It is also highly dependent on the topology and the structure of the service components. On the surface, it may be tempting to conclude that any QoS alerts associated with a service sub-component (such as a router, or a server) imply that the service that uses that degrading router or server is impacted. In practice, the analysis is much more involved. The uncertainty is mainly a result of the self-healing or fault-hiding capabilities of IP networks and many fault tolerant mechanisms that are built into the service implementation.

A simple example is that the failure of a router interface may be automatically by-passed by the routing algorithm and subsequently; the router interface failure may manifest itself as just a drop in capacity, which may or may not be impacting the end-service depending on the traffic load. Another example that shows contradiction to the direct association of QoS alert to service impact is in server load balancing. In this scenario, an application is load-balanced among multiple servers, each running a copy of the application software. Requests for service are served by multiple servers according to certain load-balancing algorithm such as DNS round robin, or traffic-based allocation. If one of the servers indicates a hard failure, that server becomes unavailable, which is traditionally a severe alarm. However, since other servers are still functioning properly, depending on the load-balancing algorithm (e.g. traffic based), all the requests may now be directed to the remaining healthy servers. In this scenario, once again service impact may not be severe if the load is light.

A software service component represents a single application or piece of an application running on a computer host. In the service model, software components depend upon a hardware host and one or several interfaces, and impact server cluster components. An example of a Server Software component is an SMTP server application program. Another example of a Software component is a software-based load balancer application.

Several different types of alerts are issued from software components: performance alerts, load-related performance alerts, and availability alerts. Performance and Load alerts are QoS performance alerts, triggered by threshold-crossings of load-related KPIs (e.g. host CPU load, interface utilization, and client transaction times). When these KPIs cross mid-value thresholds, a performance alert is issued to impacted service components in the service model, grouping together all simultaneously occurring related KPI threshold crossings and including these in the propagated alert.

The IP LAN service component 652 represents a collection of IP nodes used as a common infrastructure to provide IP connectivity to a number of servers and clusters. End-to-end, probe- or EMS-based data is used to determine the performance of these networks. Individual node/interface utilization data is used to determine network utilization, which is indicative of future performance/availability problems. As with other component types, related simultaneous KPI threshold-crossings are reported and propagated as a single alert.

In the service model, Server Cluster components depend on IP LAN components to provide connectivity between servers and load balancers. Performance, utilization, and availability of the LAN affect the parent server cluster.

Figure 10:
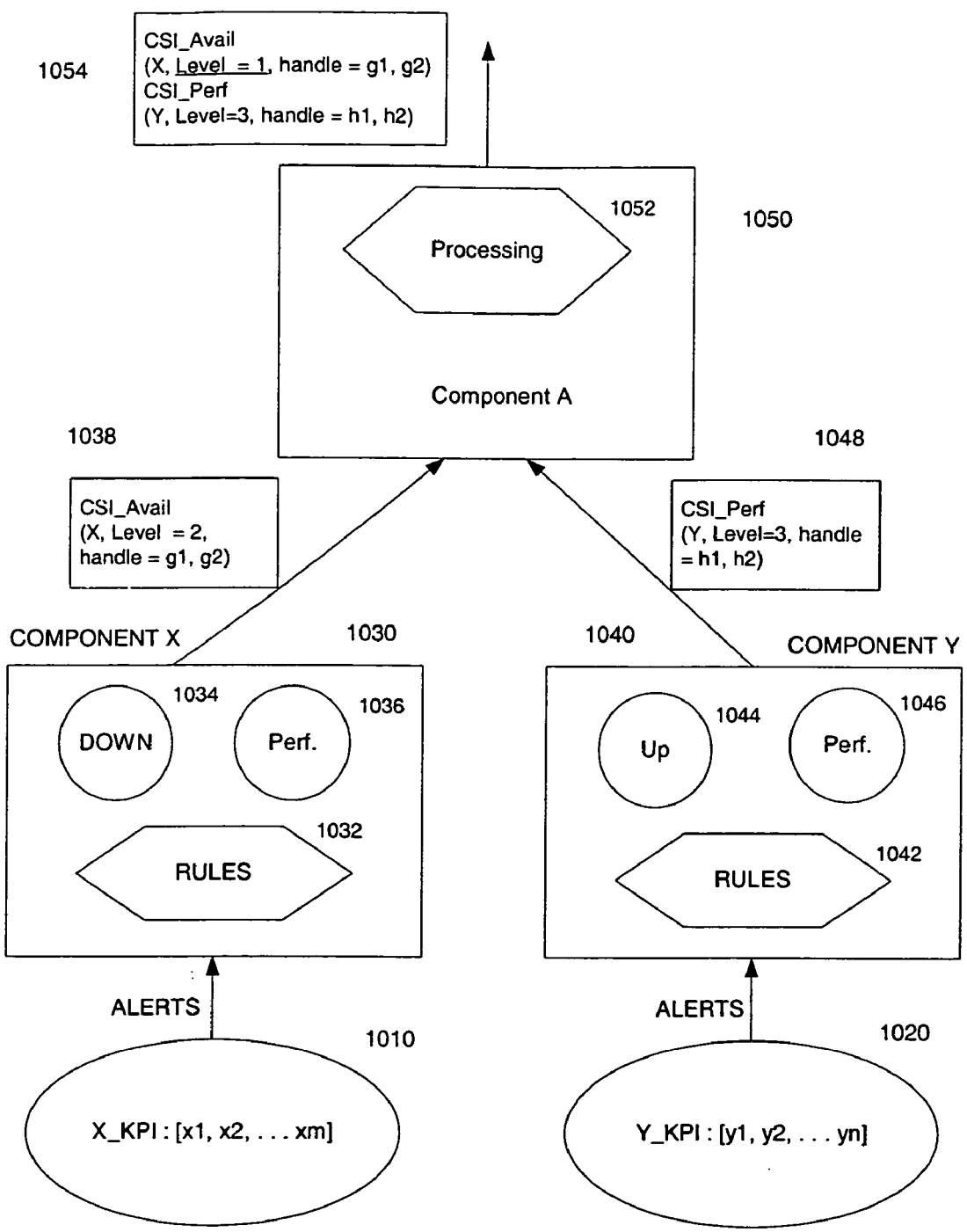
FIG. 10 depicts a high-level architecture of the alert prioritization system of the present invention.

FIG. 10 depicts the high-level architecture of the present invention to a Component A made of two sub-components X and Y. KPI alerts are grouped into categories by component such as X_KPI:{x1, x2, . . . xm} 1010 and Y_KPI:[y1, y2, . . . yn] 1020 rather than analyzing each KPI alert independently. All KPI alerts are first grouped by component. KPI alerts within a component are further grouped into two broad categories: availability and performance to create an availability indicator 1034 and 1044 and a performance indicator 1036 and 1046 for each using rule engines 1032 and 1042. It is possible that other broad categories could also be implemented in addition to availability and performance, for example, usage/load or security. Rule engines 1032 and 1034 are general-purpose processors capable of executing the rule programs written in one or more high-level programming languages.

The availability category is an indication of the level of availability of the component. Three levels are defined. At level 3 the component is totally down such as in a hardware failure condition. At level 2 the component is partially down, meaning that part of the component is down. At level 1 certain statistical downtime attributes exceed thresholds and all key performance indicators are poor, meaning component is still up, but there is very poor performance in all performance measures. In terms of severity, level 3 is most severe and level 1 is least severe.

The performance category is an indication of the overall performance of the component. Three levels are defined. At level 1 the performance is slightly degraded. At level 2 the performance is degraded and at level 3 the performance is severely degraded.

In addition, a handle identifying the alert and an optional field of text describing the alert are defined. These handles are KPI information from a specific component that will enable technicians to more efficiently deal with the cause of the alert.

The component alert group, together with the handle forms the Component Status Indicator (CSI_alert group). CSI Indicators 1038 and 1048 are then combined by rule processing element 1052 to develop a CSI Indicator 1054 for Component A, as component A is dependent on Components X and Y. Component X forwards a CSI availability indicator because it is currently down with a level 2 severity problem. Component Y forwards a CSI performance indicator because it is currently available but performance is severely degraded, i.e., level=3. Component A forwards availability and performance indicators based on those received from components x and y. An additional example of a CSI_alert group is:

CSI_Perf: [MMSC_Cluster: P=(level 3); PH=010, 059; "% of message successfully delivered<98%"]

CSI_Avail: [IP LAN: A=(level 2=unavailable); handle=12, "Router x is down"]

When the CSI_alert group propagates to the parent component at the next higher or upstream level, the parent component performs two tasks. First, the parent component assigns an availability indicator and a performance indicator for itself, taking into account all the CSIs from its downstream "children" components and any alerts processed at that level. Second, the parent component makes a decision whether to modify the severity level of both the availability and performance CSIs of its children.

The rules that are used to determine the CSI availability and performance indicators are changeable by user. Table 1 is an example of an impact rule.

TABLE 1

| Components | Component KPIs | Rule | Impact on Service |
|---|---|---|---|
| Radius Authentication Application Server (Application software) | Performance:<br>1. Client transaction time<br>2. Client transaction failure time<br>3. Interface packet loss<br>4. Interface delay<br>5. Host CPU Load<br>6. Interface utilization<br>7. Host RAM usage<br>8. Host disk usage<br>9. Instantaneous number of clients<br>10. Instantaneous number of client transactions<br>Availability:<br>1. Interface availability<br>2. Host availability | If (P.3 > threshold, t) or (P.4 > t) or (P.1 > t or (P.2 >t) Then ASW_P=3<br>If (P.6 > t) or (P.5 > t) or (P.7 > t) or (P.8 > t) or (P.9 > t) or (P.10 > t) Then ASW_P=2<br>If (P.3 > high_t) or (P.4 > high_t) or (P.1 > high_t) or P.2 > high_t) Then ASW_A = 2<br>If (A.1 == down) or (A.2 == down) Then ASW_A = 3 | Setup_Success=ASW_A<br><br>Setup_Time=ASW_P |

Rules may be static or dynamic. Static rules do not change over time. Dynamic rules can change over time, by the number of subscribers, by the value of the service at a certain time or by geography. Rules are generally written by a central network operator in order to have consistency but should take into account the expertise of those most knowledgeable with the component about which the rule is being written. This enables technical expertise regarding a component to be used in the analysis of impact and also in the handling of an alert.

Each CSI group is assigned a time duration. This duration is defined to be the maximum time duration of all contained handles. For example, suppose a particular CSI performance alert group contains handles H1 (duration 1 hour), H2 (duration 30 minutes) and H3 (duration 2 hours). The handle with the maximum time duration in this group is H3. Therefore, the time duration of the whole CSI performance indicator is 2 hours. The duration of individual handles is the length of time that the handles have been continuously active up to the present time. For example, if the system collects packet loss information at 15-minute intervals, and the packer loss measurement has exceeded the performance alert threshold for the past two sampling intervals then the time duration of the packet loss alert handle is 30 minutes.

Figure 11:
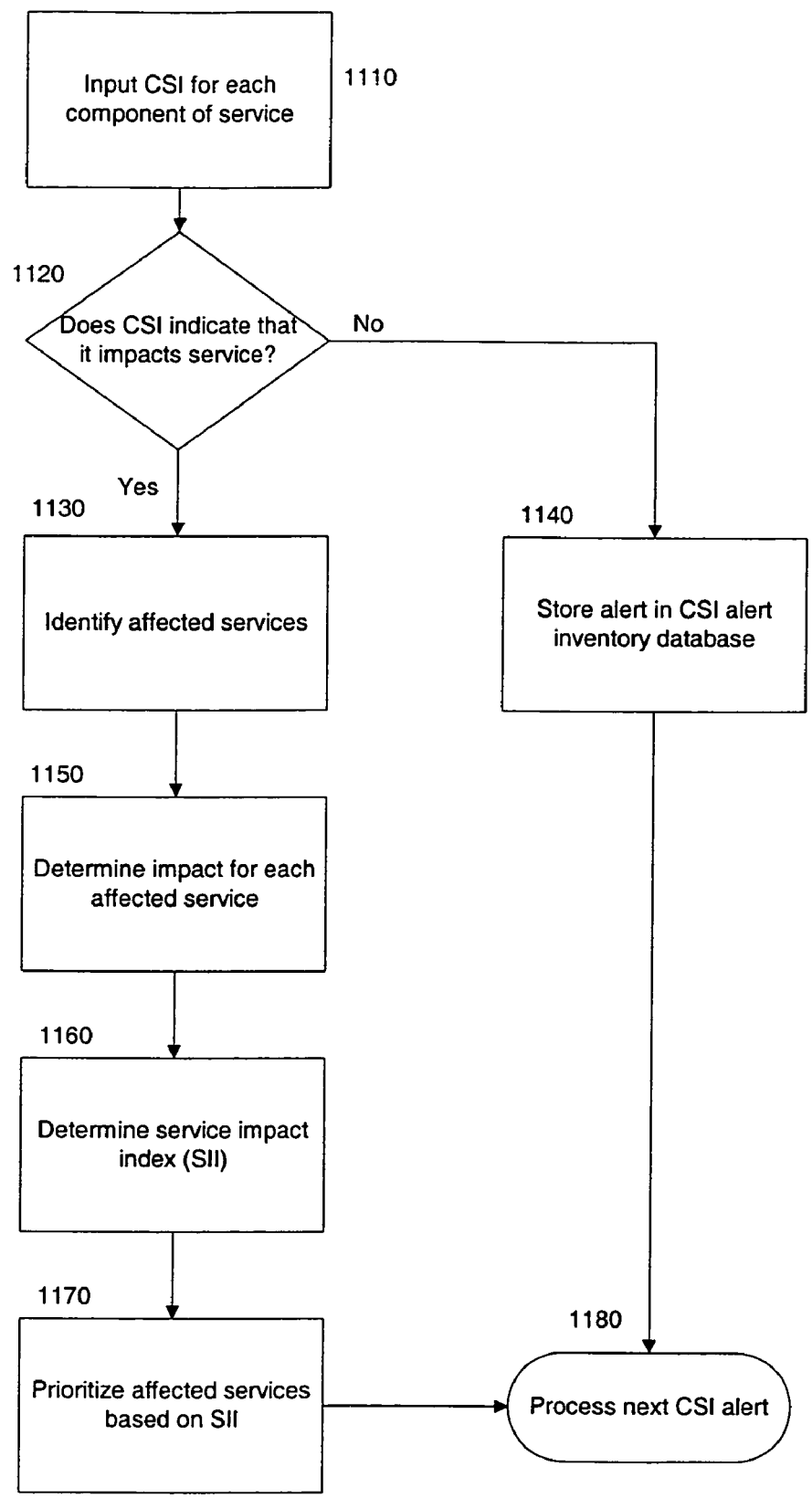
FIG. 11 depicts the process flow of the alert prioritization and service impact analysis method of the present invention; and, FIG. 12 depicts the process flow of the service impact analysis method of the present invention.

FIG. 11 depicts a high level flow diagram for service impact analysis in accordance with the present invention. A plurality of CSI alerts ($X_1 \ldots X_n$) is collected and forwarded to decision logic that determines at step 1110 if the CSI alerts impact performance or availability. If a CSI alert affects performance or availability it is forwarded to additional decision logic at step 1120 that determines of the alert is service affecting through the application of impact rules. If the alert is not service affecting it is forwarded to and stored in an alert inventory database at step 1140. The alert inventory can be analyzed at a later point to look for patterns in alerts, etc. If the alert is service affecting it is used to identify the affected service or services at step 1130. At step 1150 for each affected service the impact on the affected service is determined by estimating one or more of the following parameters: the number of affected customers; the number of affected premium customers; the number of premium services affected; the degree of service impact index (SII) and the duration of the alert. At step 1160 rules are applied to generate a service impact index based on the information gathered in step 1150 generating a plurality of SII ($I(x1) \ldots I(xn)$) which are then prioritized at step 170 based on the amount of impact into a priority list. The priority list enables the network operator to quickly identify which alerts are related to problems having the greatest impact on service.

In an alternative embodiment of the present invention the implementation may be simplified by not defining the intermediate rules. This means that once the alerts "CSI_Avail" and "CSI_Perf" are defined for the low level components, they will not be modified by intermediate components of the service model.

Figure 12:
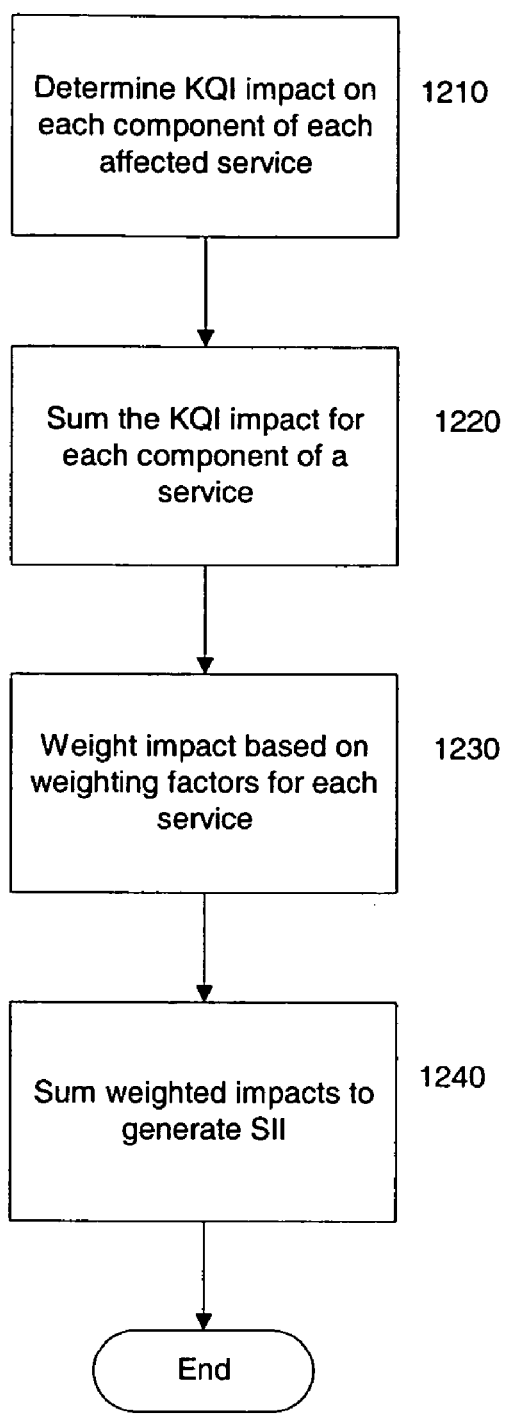

Once a CSI alert is determined to be service affecting, the impact with respect to the degradation in quality of the service must be quantified. A service impact index (SII) can be defined as a weighted sum of a set of pre-defined KQIs. FIG. 12 depicts the process flow for this determination. At step 1210 the KQI impact on each component of each affected service is determined. At step 1220 the sum of the KQI impact for each component is calculated. At step 1230 weighting factors based on information such as the number of affected users, the duration of the alert, the affect on premium services, etc. are used to weight the summed KQI impact. These weighted and summed KQI impacts are then a service impact index that can be prioritized as discussed above.

In summary, the key elements of the method of the present invention are set forth below. Creation of a service dependency model, which is driven by different phases of a service, is key to being able to understand how alerts at the lowest level of the network components affect the overall service for which they are but a component. Alerts are assigned a "handle" and a severity level. Rules are defined to be applied to the alerts to create a Component Status Indicator for each component. As each CSI propagates up towards the top of the service model dependency graph, each CSI gets modified according to predefined rules.

A service impact index is created when the CSI is propagated to the top service component. For each service that is impact, weights (multiplier) are defined according to duration of the alert, number of subscribers, number of services, QoS class of the services impacted or other factors defined by user. The weights are used to multiply the SII to obtain the overall impacting index, which is sorted to obtain the priority list.

The key weights for prioritization are as follow. The service index is computed from the impact level of the KQIs (from setup and data transfer). SI has to be computed for each sub-service separately and the results added together to form the service impact index.

The number of subscriber's index is a number representing the importance of the number of subscribers. The duration of the outstanding alert is defined with respect to a sampling period. If the problem is corrected, the alert is expected to be removed. Long outstanding alerts are given more weight that fresh alerts. The index of 1–3 is used to represent the weight of the duration. The number of services will be identified by the CSIs and the total impact depends on all of the impacted services. After all of the weights are computed, a single index for a particular CSI is obtained. Tables 2 and 3 show the calculation of the Total Impact Index based on a weighted sum of the individual service impact indexes across a plurality of services.

TABLE 2

| Component Alerts | Services, QoS class | | Sub-services, Subscribers,Impact on KQI (0- no impact, 3-most impact) Service Index = (Setup_suc + setup_time + Data Transfer_Avail + DataTransfer_Perf) | | | Duration of Alert(1- short, 2- long, 3- very long) | Priority Rank |
|---|---|---|---|---|---|---|---|
| | Service | QoS Class | Sub-services | Sub-scribers | Service Index | | |
| CSI_Avail Router (level = 2) Handles: g1, g2, | MMS | *5 | MM-MM | *0.5 | 1 + 1 + 1 + 0 = 3 | *3 | 1 |
| | | | MM-LT | *2 | 1 + 2 + 0 + 1 = 4 | | |
| | | | Email | *1 | 1 + 1 + 1 + 0 = 3 | | |
| | | | Content | *0.5 | 1 + 2 + 0 + 0 = 3 | | |
| | | | | | Sub-total : 210 | | |
| | Email | *3 | Sub-service 1 | *10 | 4 | *3 | |
| | | | Sub-service 2 | *10 | 4 | | |
| | | | | | Sub-total: 720 | | |
| | | | | Total Impact Index: 930 | | | |

TABLE 3

| Component Alerts | Services, QoS class | | Sub-services, Subscribers,Impact on KQI (0- no impact, 3-most impact) Service Index = (Setup_suc + setup_time + Data Transfer_Avail + DataTransfer_Perf) | | | Duration of Alert(1- short, 2- long, 3- very long) | Priority Rank |
|---|---|---|---|---|---|---|---|
| | Service | QoS Class | Sub-services | Sub-scribers | Service Index | | |
| CSI_Perf SMS (level = 3) Handles: h1, h2, h3 | MMS | *5 | MM-MM | *0.5 | 1 + 2 + 0 + 0 = 3 | *2 | 2 |
| | | | MM-LT | *2 | 1 + 2 + 0 + 0 = 3 | | |
| | | | Email | *1 | 1 + 0 + 1 + 0 = 2 | | |
| | | | Content | *0.5 | 1 + 2 + 0 + 0 = 3 | | |
| | | | | | Sub-total: 110 | | |
| | Voice Portal | *3 | Sub-service1 | *4 | 3 | *2 | |
| | | | Sub-service2 | *5 | 4 | | |
| | | | | | Sub-total: 192 | | |
| | | | | Total Impact Index: 302 | | | |

The above method can be extended to enable the network operator to use the information generated during alert prioritization and service impact analysis for root cause analysis. Root cause analysis (RCA) deals with the problem of identifying the root cause or causes of one or more alerts. This problem is the reverse of service impact analysis and alert prioritization described above. For service impact analysis and alarm prioritization, the CSIs generated at each level of the service model dependency graph are used to generate additional CSIs at the next level and are used at the top level to generate a service impact index. Once the service impact of failures and service degradations are identified, and the alerts are prioritized, the problem of repairing the problems, by diagnosing the root cause or causes and restoring the service can be addressed by the network operator. The present method aids RCA and minimizes the need for additional diagnostic testing. By drilling-down along the paths the service impact analysis and alert prioritization followed upward in the service model dependency graph, and referencing the handles associated with the alerts contained within one or more CSIs, the network operator can identify the most likely cause of network failures or service degradation at the most likely and lowest layer of the service model dependency graph.

The data input to a component of the service model dependency graph consist of the following: (1) alerts from an alert system for that component; (2) CSIs from the downstream "children" components; and, (3) performance data collected from a data collection agent such as a probe, EMS or NMS). As discussed above, all of the above inputs are processed for each component using a set of rules. The rules make decisions on whether to issue a CSI at that level which can then be used by an upstream level or "parent" component. When the rule engine decides that a CSI should be issued, it is because certain rules are met. When rules are not met, alerts are suppressed, meaning that the alert under examination will not cause a service problem. This component level filtering of alerts eliminates unnecessary processing further upstream. Thus, execution of the rules within a component is a local diagnosis of the potential performance problems. The result of the rule execution provides valuable information that can be used for service and system level root cause diagnosis. This information is available to the network operator for root cause analysis through the handle component of the CSI and handle propagation.

Figure 13:
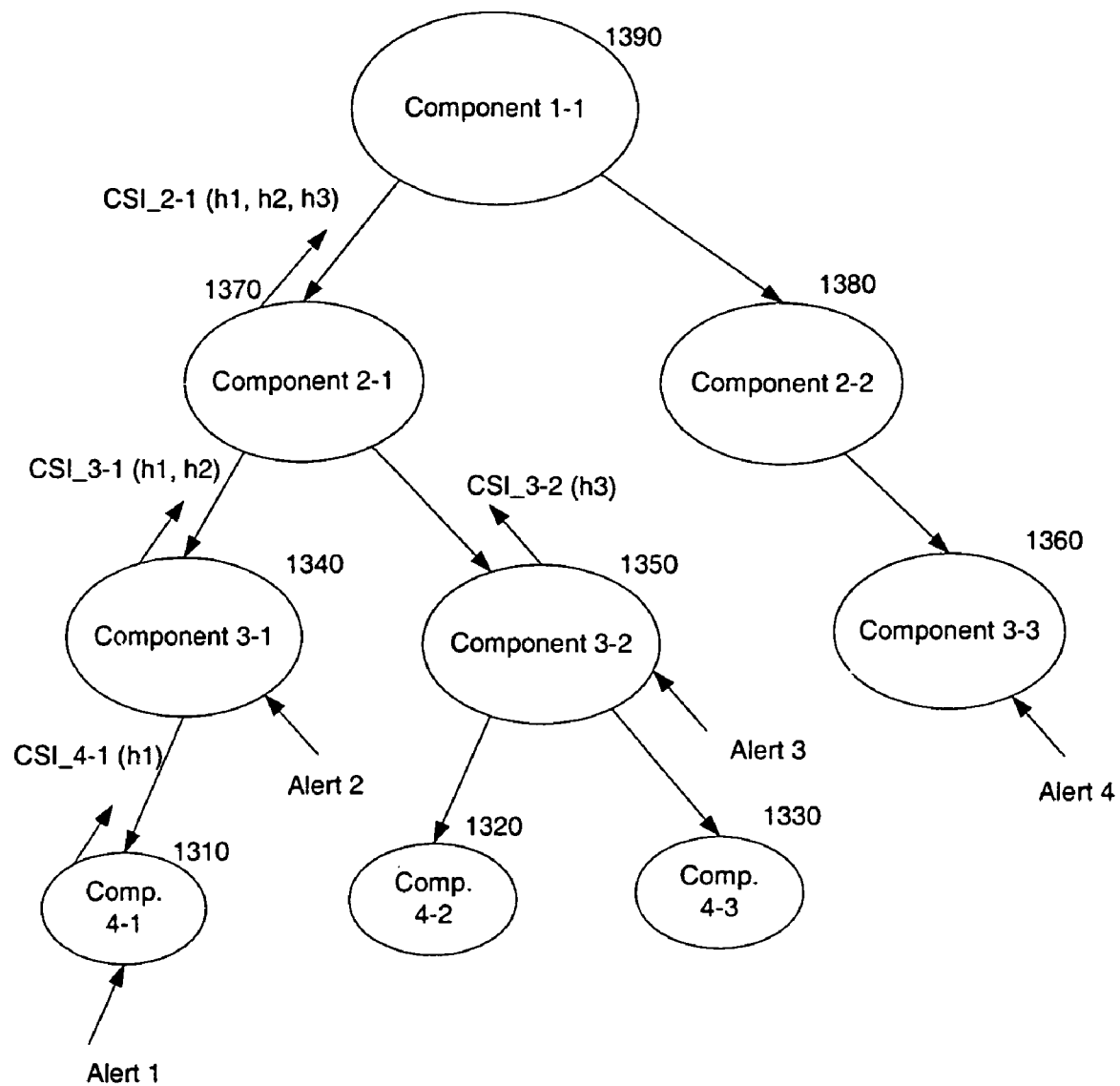
FIG. 13 depicts a graph of the propagation of handles through generation of Component Status Indicators (CSI) at the various component levels in a service model dependency graph.

Referring to FIG. 13, alert 1 at Component 4-1 1310 becomes handle h1 in the CSI_4-1 (h1) propagated at Component 4-1 since a rule or rules inside Component 4-1 1310 were satisfied. At this time, information about CSI_4-1 is recorded in a CSI Table as depicted below in Table 4. The CSI Table identifies the CSI ID, the handles the time stamp and the rules that have been met. CSI_4-1 propagates upstream to Component 3-1 1340 where a different set of rules uses alert information such as that provided by alert 2, performance data and CSI_4-1 to determine if any rules have been met. When one of more rules conditions are satisfied, CSI_3-1 is issued, with relevant information stored in a CSI Table such as Table 4. Alert 2 becomes handle 2 (h2) in CSI_3-1.

At some components, such as Component 4-2 1320, Component 4-3 1330, Component 3-3 1360 or Component 2-2 1380 there may be no alerts that cause CSIs to be propagated by the rules. Similar rule processing occurs at the other components such as Component 3-2 1350 where CSI_3-2 (h3) with handle h3 is generated based on rules and alert 3 and at Component 2-1 1370 where CSI_2-1 (h1, h2, h3) is generated based on a set of rules and the CSIs from "children" Components 3-1 and 3-2. When handles such as h1 and h2 are propagated along the generation of new CSIs, the information regarding the path traversed will be added to the handle, so that the CSI appears as follows:

$$CSI\_2\text{-}1 = (\ldots h1(path=2\text{-}1, 3\text{-}1, 4\text{-}1), h2(path=2\text{-}1, 3\text{-}1), h3(path=2\text{-}1, 3\text{-}2))$$

The path ID of the handle gives the component ID along which the handle is propagated. A separate table stores information about the handle and its corresponding alert, threshold, time of violation, etc. The handle table provides further information regarding the nature of the CSI when further drill-down actions are desired. The CSI from Component 2-1 1370 can be used to develop a top level CSI and service impact analysis at Component 1-1 1390.

TABLE 4

| CSI_ID | Handles | Time | R ason for CSI G n ration |
|--------|---------|------|---------------------------|
| 2-1 | h1, h2, h3 | Dec. 10, 2004 9:00–10:00 am | Propagate all sever alerts |
| 3-1 | h1, h2 | Dec. 10, 2004 9:00–10:00 am | Alert 2 severity high. Premium customer interface affected |
| 3-2 | h3 | Dec. 10, 2004 9:00–10:00 am | POP3 Server cluster load balance exceed threshold |
| 4-1 | h1 | Dec. 10, 2004 9:00–10:00 am | Router interface down |

During root cause analysis, the handles, which make their way to the top level, carry information for easy retrieval of all the relevant correlated information related to the analysis of the root cause. This information is extremely useful to the network operator or troubleshooter since much of the root cause analysis is contained therein.

The above-described method may be implemented either in the network operations center as part of the service level management function, as a service bureau or in a distributed matter by pushing some of the application of the rules and generation of CSI alerts into the central office. The rules can be implemented to execute on a general purpose computer having one or more processors in many different programming languages. The network operations center and the central office processors that execute rules related to the components located at or near that office may execute different sets of rules written in different programming languages. The important factor is the format of the CSI and the ability of the downstream processors to communicate with the upstream processors through the format of the CSI. Also, in order to pass either alerts or CSI from a downstream level of the service model dependency graph to an upstream level there needs to be a communication path between the components, whether such a path is a direct physical connection or a virtual connection through a network connection, such as the Internet.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. In a telecommunications network represented by a service model dependency graph having a plurality of components in a set of nested levels indicating upstream and downstream components, the method of handling alerts comprising the steps of:
   receiving one or more alerts for a component;
   generating a handle for each received alert wherein said handle includes information about the alert;
   generating a component status indicator for the component based on a set of pre-defined rules which rules utilize the component status indicators of downstream components and information from the handles generated from alerts received at the component; and,
   associating the results of the rule evaluation, the handles used by the rule evaluation and the component status indicators of the downstream components with the component status indicator for the component.

2. The method of claim 1 further comprising the step of associating with the component status indicator the path each handle has taken through the service model dependency graph.

3. The method of claim 2 further comprising the step of performing root cause analysis for a service-impacting component status indicator.

4. The method of claim 3 wherein the step of performing root cause analysis for a service impacting component status indicator comprises the steps of:
   retrieving the path the service-affecting handle or handles have taken through the service model dependency graph;
   at each component through which the service affecting handles or handles have taken retrieving the information associated with the component status indicator and the associated handles for the component.

5. The method of claim 1 wherein the handle includes information about the type of alert, the time of the alert and the duration of the alert.

6. The method of claim 1 further comprising the step of generating a service impact index at the top level of the service model dependency graph wherein the service impact index is an indicator of the impact of downstream alerts on the quality of service.

7. The method of claim 6 further comprising the step of generating a total impact index by summing the service impact indexes for a plurality of services.

8. The method of claim 7 further wherein the total impact index is calculated by summing the service impact index for each service multiplied by a predetermined weighting factor.

9. The method of claim 7 further comprising the step of prioritizing the impact of the alerts based on the total impact index.

10. The method of claim 9 wherein the step of generating a total impact index and prioritizing the impact of alerts is performed in a central network operations center.

11. The method of claim 6 further comprising the step of prioritizing the impact of the alerts based on the service impact index.

12. The method of claim 1 wherein the step of generating a component status indicator for one or more components is performed in the central office housing the component.

13. The method of claim 1 wherein the steps of generating component status indicators are performed in a central network operations center.

14. The method of claim 1 further comprising the step of storing alerts that are not service affecting in an alert inventory.

15. A system for the handling of alerts in a telecommunications network, wherein the network is modeled as a service model dependency graph having a plurality of components in a set of upstream and downstream levels, comprising:
   a means for receiving alerts at a component of the network;
   a means for generating a handle in response to each alert wherein the handle provides information about the alert;
   a rule engine which utilizes the component status indicator of one or more downstream components and the handles generated in response to alerts to generate a component status indicator for each component; and,
   a means for associating the results of the rule evaluation, the handles used by the rule evaluation and the component status indicators of the downstream components with the component status indicator for each component.

16. The system of claim 15 wherein the rule engine resides at the component.

17. The system of claim 15 further comprising a network operations center in communication with each component and wherein the rule engine performs the rule evaluation to generate the component status indicator for each component.

18. The system of claim 17 wherein the network operations center further comprises a means for using the alert information in the handles to perform root cause analysis.

19. The system of claim 17 wherein the network operations center further comprises a means for generating a service impact index indicative of the quality of Service impact of alerts that reach the top level of the service model dependency graph.

20. The system of claim 19 wherein the network operations center further comprises a means for generating a total impact index indicative of the impact on the quality of service across a plurality of services.

* * * * *